May 29, 1956  HANS-GEORG TRIESCHMANN ET AL  2,748,065
PURIFICATION OF ADIPONITRILE
Filed April 27, 1954
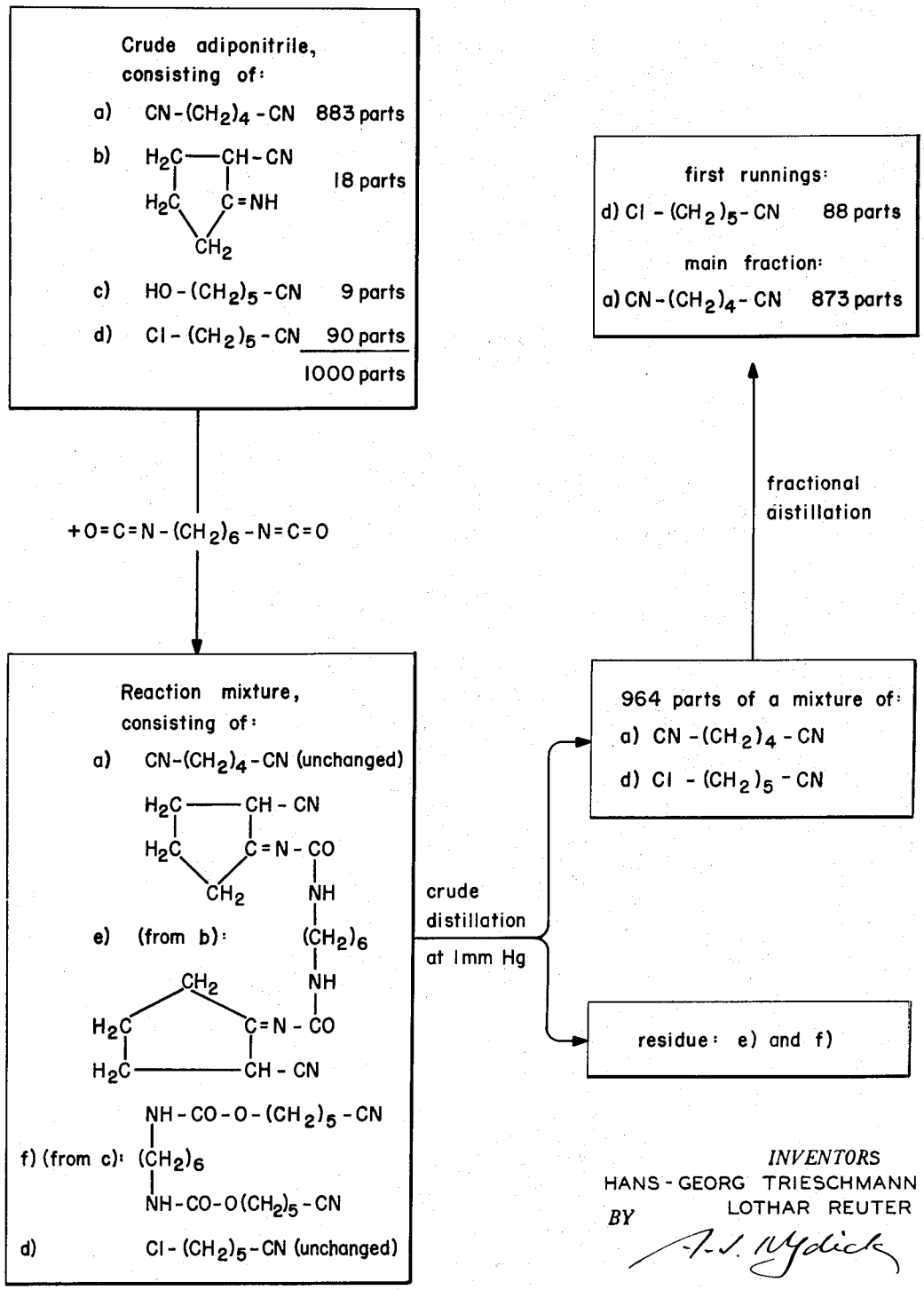
INVENTORS
HANS-GEORG TRIESCHMANN
LOTHAR REUTER
BY
/s/ T. J. Wydick
ATTORNEY

2,748,065
PURIFICATION OF ADIPONITRILE

Hans-Georg Trieschmann, Ludwigshafen (Rhine), and Lothar Reuter, Ludwigshafen (Rhine-Oppau), Germany, assignors to Badische Anilin- & Soda-Fabrik Aktiengesellschaft, Ludwigshafen (Rhine), Germany Application April 27, 1954, Serial No. 426,022

8 Claims. (Cl. 202—57)

This invention relates to an improved process for the purification of adiponitrile.

Adiponitrile, which is prepared on a commercial scale by the reaction of 1.4-dichlorobutane with alkali cyanide, always contains small amounts of by-products, in particular 1-cyano-2-iminocycolpentane, delta-chloro- and delta-hydroxyvaleronitrile, from which it can hardly be freed by distillation.

We have now found that adiponitrile of the said provenience can be freed in a simple manner from the said by-products by treating it with an amount of organic isocyanates calculated with respect to the NH- and OH-groups present and then distilling the reaction mixture. By the treatment with isocyanates, the 1-cyano-2-iminocyclopentane is converted into a urea derivative, and the delta-hydroxyvaleronitrile is converted into a urethane which have a higher boiling point than adiponitrile and delta-chlorovaleronitrile; the mixture of the two last-mentioned substances can therefore be distilled off. Then by fractional distillation it is easy to separate the distillate into practically pure adiponitrile and delta-chlorovaleronitrile.

As organic isocyanates there may be used mono- or polyvalent isocyanates, as for example phenylisocyanate, dodecyl isocyanate, hexamethylene di-isocyanate, toluylene di-isocyanate or 1.3.5-tri-isocyanobenzene. The reaction commences even at room temperature and is completed during the subsequent heating at the latest before the mixture begins to distil over.

The following example will further illustrate this invention but the invention is not restricted to this example. The parts are parts by weight.

Example

A crude adiponitrile, prepared in known manner by the reaction of 1.4-dichlorobutane with sodium cyanide, and which contains, besides 883 parts of pure adiponitrile, 18 parts of 1-cyano-2-iminocyclopentane, 9 parts of delta-hydroxy- and 90 parts of delta-chloro-valeronitrile is stirred at room temperature while 21.6 parts of hexamethylene di-isocyanate are added. The mixture is then distilled at 1 torr; there pass over 964 parts of a mixture of adiponitrile and delta-chlorovaleronitrile which has no hydroxyl number and only contains about 0.13% of imine. The mixture is again fractionally distilled; a first runnings of 88 parts of delta-chlorovaleronitrile having a boiling point of 58° to 62° C. at 1 torr is obtained which can be reacted again with sodium cyanide. The main fraction consists of 873 parts of practically pure adiponitrile. 1 torr corresponds to 1 mm. Hg.

The flow diagram accompanying this specification is illustrative of the process.

What we claim is:

1. A process for the purification of adiponitrile prepared in a known manner by the reaction of 1.4-dichlorobutane with alkali cyanide and containing as by-products 1-cyano-2-iminocyclopentane, delta-chloro- and delta-hydroxyvaleronitrile which consists in adding to said impure adiponitrile such amounts of an organic isocyanate which is equivalent to the NH- and OH-groups present and then distilling off the adiponitrile from the urea and urethane derivatives formed.

2. A process for the purification of adiponitrile prepared in a known manner by the reaction of 1.4-dichlorobutane with alkali cyanide and containing as by-products 1-cyano-2-iminocyclopentane, delta-chloro and delta-hydroxy veleronitrile which consists in adding to said impure adiponitrile such amounts of hexamethylene di-isocyanate which is equivalent to the NH- and OH-groups present, then distilling off the adiponitrile together with the delta-chlorovaleronitrile from the urea and urethane derivatives formed and fractionating the distillation product.

3. A process for the purification of adiponitrile prepared by the reaction of 1,4-dichlorobutane with an alkali cyanide, which contains as byproducts delta chloro valeronitrile, 1-cyano-2-iminocyclopentane and delta hydroxy valeronitrile, which comprises adding to the said impure adiponitrile an amount of an organic isocyanate, which is equivalent in respect of the isocyanate groups to the NH- and OH-groups contained in the byproducts of the adiponitrile, and then distilling off the adiponitrile and the delta chloro valeronitrile from the urea and urethane derivatives formed by the interaction of the isocyanate with the 1-cyano-2-iminocyclopentane and the delta hydroxy valeronitrile.

4. A process for the purification of adiponitrile prepared by the reaction of 1,4-dichlorobutane with an alkali cyanide which contains as byproducts delta chloro valeronitrile, 1-cyano-2-iminocyclopentane and delta hydroxy-valeronitrile, which comprises adding to the said impure adiponitrile an amount of an organic isocyanate, which is equivalent in respect of the isocyanate groups to the NH- and OH-groups contained in the byproducts of the adiponitrile and then distilling off the adiponitrile and the delta chloro valeronitrile under reduced pressure from the urea and the urethane derivative formed by the interaction of the isocyanate with the 1-cyano-2-iminocyclopentane and the delta hydroxy valeronitrile.

5. A process for the purification of adiponitrile prepared by the reaction of 1,4-dichlorobutane with an alkali cyanide which contains as byproducts delta chloro valeronitrile, 1-cyano-2-iminocyclopenthane and delta, hydroxy valeronitrile, which comprises adding to the said impure adiponitrile an amount of an organic di-isocyanate, which is equivalent in respect of the isocyanate groups to the NH- and OH-groups contained in the by-products of the adiponitrile, and then distilling off the adiponitrile and the delta chloro valeronitrile from the urea and urethane derivatives formed by the interaction of the di-isocyanate with the 1-cyano-2-iminocyclopentane and the delta hydroxy valeronitrile.

6. A process for the purification of adiponitrile prepared by the reaction of 1,4-dichlorobutane with an alkali cyanide which contains as byproducts delta chloro valeronitrile, 1-cyano-2-iminocyclopentane and delta hydroxy valeronitrile which comprises adding to the said impure adiponitrile an amount of an aliphatic di-isocyanate which is equivalent in respect of the isocyanate groups to the NH- and OH-groups contained in the byproducts of the adiponitrile, and then distilling off the adiponitrile and the delta chloro valeronitrile from the urea and urethane derivatives formed by the interaction of the di-isocyanate with the 1-cyano-2-iminocyclopentane and the delta hydroxy valeronitrile.

7. A process for the purification of adiponitrile prepared by the reaction of 1,4-dichlorobutane with an alkali cyanide which contains as byproducts delta chloro valeronitrile, 1-cyano-2-iminocyclopentane and delta hydroxy valeronitrile, which comprises adding to the said impure adiponitrile an amount of hexamethylene diisocyanate which is equivalent in respect of the isocyanate groups to the NH- and OH-groups contained in the byproducts of the adiponitrile, and then distilling off the adiponitrile and the delta chloro valeronitrile from the urea and urethane derivatives formed by the interaction of the di-isocyanate with the 1-cyano-2-iminocyclopentane and the delta hydroxy valeronitrile.

8. A process for the purification of adiponitrile prepared by the reaction of 1,4-dichlorobutane with an alkali cyanide which contains as byproducts delta chloro valeronitrile, 1-cyano-2-iminocyclopentane and delta hydroxy valeronitrile, which comprises adding to the said impure adiponitrile an amount of an organic isocyanate selected from the class consisting of phenylisocyanate, dodecyl isocyanate, hexamethylene diisocyanate toluylene di-isocyanate and 1.3.5-tri-isocyanobenzene, which is equivalent in respect of the isocyanate groups to the NH- and OH-groups contained in the byproducts of the adiponitrile and then distilling off the adiponitrile and the delta chloro valeronitrile from the urea and urethane derivatives formed by the interaction of the isocyanate with the 1-cyano-2-iminocyclopentane and the delta hydroxy valeronitrile.

References Cited in the file of this patent
UNITED STATES PATENTS

| | | |
|---|---|---|
| 2,222,302 | Schmidt et al. | Nov. 19, 1940 |
| 2,242,309 | Lazier et al. | May 20, 1941 |
| 2,570,794 | Grigsby et al. | Oct. 9, 1951 |